United States Patent
Staudacher et al.

(10) Patent No.: US 11,354,994 B1
(45) Date of Patent: Jun. 7, 2022

(54) ANALYTICS FOR PLANNING AN UPGRADE TO A VIDEO CAMERA SURVEILLANCE SYSTEM

(71) Applicant: MOTOROLA SOLUTIONS, INC., Chicago, IL (US)

(72) Inventors: David Staudacher, Fort Collins, CO (US); Mauricio Leal Villarreal, Dallas, TX (US); Aleksey Lipchin, Newton, MA (US); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/307,473

(22) Filed: May 4, 2021

(51) Int. Cl.
G05B 19/042 (2006.01)
G08B 13/196 (2006.01)
G06V 20/40 (2022.01)

(52) U.S. Cl.
CPC ....... G08B 13/19639 (2013.01); G06V 20/40 (2022.01); G08B 13/1966 (2013.01); G08B 13/1968 (2013.01); G08B 13/19656 (2013.01)

(58) Field of Classification Search
CPC ........ G08B 13/19639; G08B 13/19641; G08B 13/19645; G08B 13/19656; G08B 13/1966; G08B 13/1968; G06K 9/00711; G06K 9/00771; H04N 7/181; G06F 21/552; G06F 21/554
See application file for complete search history.

(56) References Cited

U.S. PATENT DOCUMENTS

| 8,482,609 | B1 | 7/2013 | Mishra et al. |
| 8,533,144 | B1 | 9/2013 | Reeser et al. |
| 9,019,273 | B2 | 4/2015 | Bai et al. |
| 9,626,849 | B2 | 4/2017 | Dixon et al. |
| 10,636,173 | B1 | 4/2020 | Beach et al. |
| 2012/0078833 | A1 | 3/2012 | Johnson |

(Continued)

FOREIGN PATENT DOCUMENTS

| EP | 3343443 A1 | 7/2018 |
| KR | 1020190058230 A | 5/2019 |

OTHER PUBLICATIONS

International Search Report and Written Opinion for Application No. PCT/PL2020/050061 dated May 4, 2021 (13 pages).

*Primary Examiner* — Thai Q Tran
*Assistant Examiner* — Jose M Mesa
(74) *Attorney, Agent, or Firm* — Michael Best & Friedrich LLP

(57) ABSTRACT

One example electronic computing device includes electronic processor configured to store a list of a plurality of video cameras being considered for an upgrade. The electronic processor may be further configured to receive first video footage captured by a first video camera and second video footage captured by a second video camera. The electronic processor may be further configured to analyze the first video footage and the second video footage to generate a plurality of upgrade priority scores. In response to determining that a first upgrade priority score of the first video camera is greater than a second upgrade priority score of the second video camera, the electronic processor may be further configured to output an upgrade priority notification configured to inform a user that the first video camera has a higher upgrade priority than the second video camera.

20 Claims, 4 Drawing Sheets

(56) References Cited

U.S. PATENT DOCUMENTS

| | | | |
|---|---|---|---|
| 2015/0116498 A1* | 4/2015 | Vartiainen | H04N 7/181 |
| | | | 348/159 |
| 2016/0132731 A1* | 5/2016 | Hisada | G06K 9/6253 |
| | | | 382/103 |
| 2018/0356809 A1 | 12/2018 | Trainor et al. | |
| 2019/0288911 A1 | 9/2019 | Amini et al. | |
| 2019/0342524 A1* | 11/2019 | Joao | G08B 25/14 |

* cited by examiner

ANALYTICS FOR PLANNING AN UPGRADE TO A VIDEO CAMERA SURVEILLANCE SYSTEM

BACKGROUND OF THE INVENTION

Surveillance systems may be used at many locations for security purposes, recordkeeping purposes, and/or the like. Some surveillance systems include one or more video cameras that may have been installed a significant time in the past (e.g., one year, five years, ten years, or the like). Older video cameras may utilize outdated technology and/or may not perform as well as newer, more advanced video cameras. For example, some newer cameras may have improved analytics capabilities compared to older cameras with limited or no analytics capabilities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
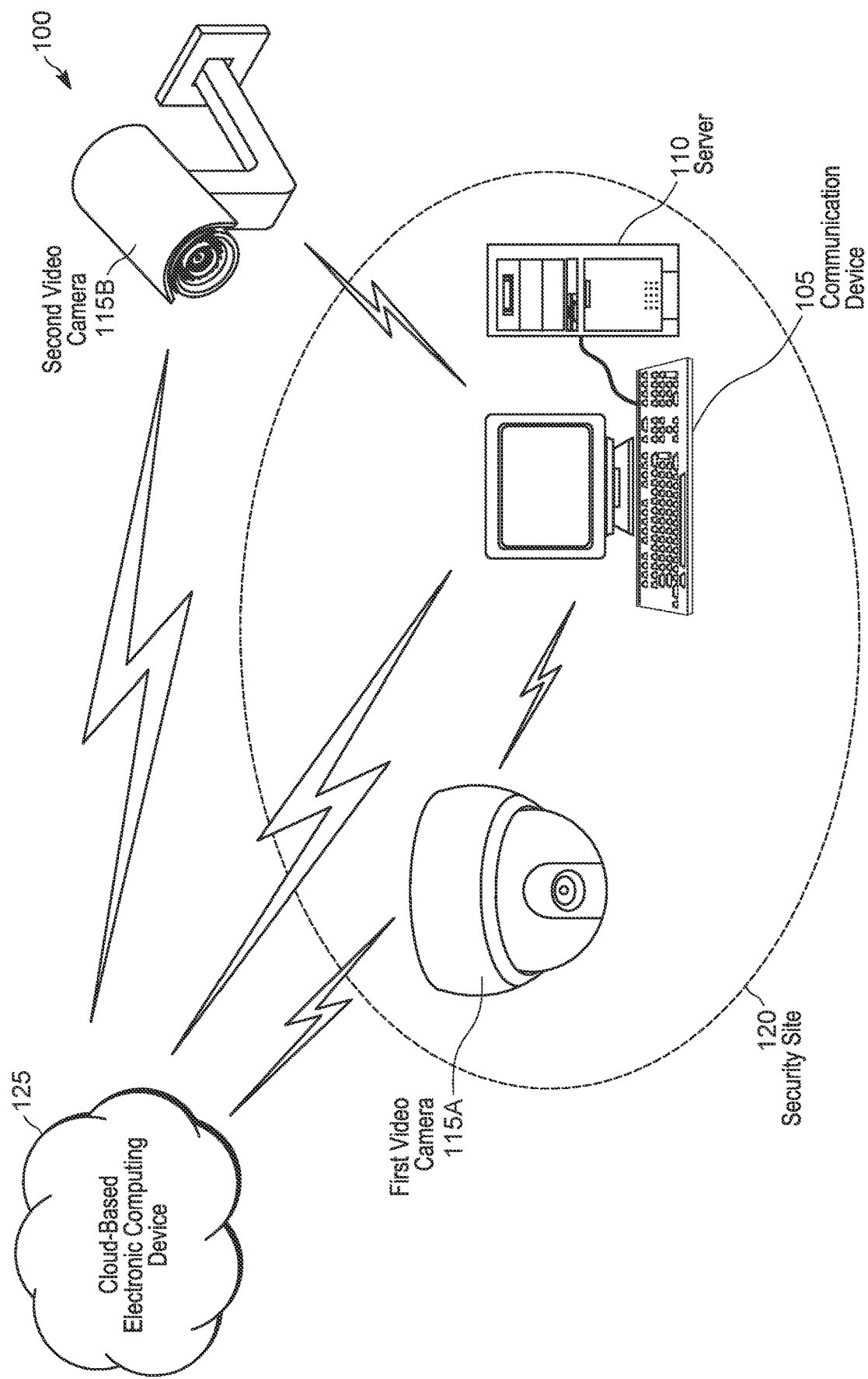
FIG. 1 is a diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, some existing surveillance systems include one or more video cameras that may utilize outdated technology and/or may not perform as well as newer, more advanced video cameras. For example, recent advances in video analytics may provide benefits to owners of surveillance systems to enhance the security of facility or location (a security site) being monitored by the surveillance system (e.g., detecting specific types of objects, determining and/or recording motion and/or attributes of objects, performing facial recognition, performing license plate recognition, performing other object analysis of video footage, etc.). Additionally, existing video cameras may operate less efficiently than newer video cameras, for example, by consuming more power or requiring more extensive processing/filtering capabilities to analyze low quality video footage/data captured by the existing video cameras.

However, it may be impractical for some owners of surveillance systems to replace all or many of their video cameras with new, analytics-enabled video cameras. For example, the existing video cameras may be located in locations that are difficult to access to replace the existing video cameras. As another example, replacing all or most existing video cameras with new video cameras may be prohibitively expensive. Accordingly, there is a technological problem with respect to determining which video cameras of a surveillance system to replace in order to provide enhanced surveillance of the security site in a practical manner and/or improved performance of a surveillance system.

To address this technological problem, disclosed are, among other things, methods, devices, and systems to determine an upgrade to a video camera surveillance system based on video footage obtained from a plurality of video cameras included in the surveillance system. In some embodiments, the disclosed methods, devices, and systems address the technological problem by determining a minimum subset of video cameras to be upgraded in order to yield adequate video camera coverage of the security site to perform video analytics of footage of one or more areas of the security site. For example, adequate video camera coverage may be determined based on video camera adjacency and areas of coverage overlap, vantage points of one or more video cameras that are suitable for using video analytics to analyze captured footage (e.g., facial recognition, license plate recognition, performing other object analysis of video footage, etc.), traffic patterns of objects through the field of view of one or more cameras, and/or the like.

The disclosed methods, devices, and systems provide, among other things, mechanisms and techniques for determining whether video coverage is enhanced by the replacement of existing video cameras, the installation of new video cameras, combinations of replacement and new installation, and/or modified operation of existing video cameras to perform video analytics of their footage at a remote location. Mechanisms and techniques provided herein may reduce or prevent replacement and/or installation of video cameras that yield little or no improvement in video data being analyzed (e.g., by a video analytics engine) to maintain security of the security site. The mechanisms and techniques are technological improvements because they improve object detection by the surveillance system in an efficient manner by recommending modifications to the surveillance system. Additionally, the mechanisms and techniques are technological improvements because they improve efficiencies in power consumption (e.g., the power consumed by video cameras) and the consumption of other resources (e.g., network bandwidth for cameras communicating captured video data over a network, processing power used to process the captured video data with the video analytics engine, etc.). Similarly, the disclosed methods, devices, and systems may identify particular video cameras for replacement when such video cameras operate less efficiently than newer video cameras. Such identification results in a technological improvement to the surveillance system, for example, in the form of allowing the surveillance system to consuming less power or less extensive processing/filtering capabilities without reducing (or while minimally reducing) the surveillance capabilities of the surveillance system. Additionally, the disclosed methods, devices, and systems may recommend more cost-effective improvements to the surveillance system besides replacing an existing video camera when the existing video camera is capable of capturing adequate footage for video analytics purposes. For example, the disclosed methods, devices, and systems may recommend adding lighting to an area monitored by the existing video camera to improve a quality of captured footage at times when the area is typically dark. The disclosed methods, devices, and systems may determine an efficient upgrade plan for a surveillance system to yield adequate coverage of a security site in general, or with respect to a budgetary constraint associated with the desired upgrade of the surveillance system.

One embodiment provides an electronic computing device that may include an electronic processor that may be configured to store a list of a plurality of video cameras being considered for an upgrade. The plurality of video cameras may be installed at a security site and may include a first video camera and a second video camera. The electronic processor may be further configured to receive first video footage captured by the first video camera and second video footage captured by the second video camera. The electronic processor may be further configured to analyze, using a video analytics engine and based on a plurality of upgrade priority weighting factors, the first video footage and the second video footage to generate a plurality of upgrade priority scores including i) a first upgrade priority score for the first video camera, and ii) a second upgrade priority score for the second video camera. The electronic processor may be further configured to determine that the first upgrade priority score is greater than the second upgrade priority score. In response to determining that the first upgrade priority score is greater than the second upgrade priority score, the electronic processor may be further configured to output an upgrade priority notification configured to inform a user that the first video camera has a higher upgrade priority than the second video camera.

Another embodiment provides a method for identifying a video camera to be upgraded. The method may include storing, with an electronic processor of an electronic computing device, a list of a plurality of video cameras being considered for an upgrade. The plurality of video cameras may be installed at a security site and may include a first video camera and a second video camera. The method may further include receiving, with the electronic processor, first video footage captured by the first video camera and second video footage captured by the second video camera. The method may further include analyzing, with the electronic processor using a video analytics engine and based on a plurality of upgrade priority weighting factors, the first video footage and the second video footage to generate a plurality of upgrade priority scores including i) a first upgrade priority score for the first video camera, and ii) a second upgrade priority score for the second video camera. The method may further include determining, with the electronic processor, that the first upgrade priority score is greater than the second upgrade priority score. The method may further include in response to determining that the first upgrade priority score is greater than the second upgrade priority score, outputting, with the electronic processor, an upgrade priority notification configured to inform a user that the first video camera has a higher upgrade priority than the second video camera.

Another embodiment provides an electronic computing device including an electronic processor that may be configured to store a list of a plurality of video cameras being considered for an upgrade. The plurality of video cameras may be installed at a security site and may include a first video camera and a second video camera. The electronic processor may further be configured to receive first video footage captured by the first video camera and second video footage captured by the second video camera. The electronic processor may further be configured to analyze, using a video analytics engine, the first video footage and the second video footage to determine an adequacy of video coverage of each of the first video camera and the second video camera. The adequacy of video coverage may be determined based on (i) a frequency at which objects are respectively detected within the first video footage and the second video footage and (ii) a suitability level of a respective field of view of the first video camera and the second video camera for object analysis. The electronic processor may further be configured to determine that the frequency at which objects are detected within the first video footage is greater than or equal to the frequency at which objects are detected within the second video footage. The electronic processor may further be configured to determine that the suitability level of the field of view of the first video camera for object analysis is greater than the suitability level of the second video camera for object analysis. The electronic processor may further be configured to in response to determining that (i) the frequency at which objects are detected within the first video footage is greater than or equal to the frequency at which objects are detected within the second video footage and (ii) that the suitability level of the field of view of the first video camera for object analysis is greater than the suitability level of the field of view of the second video camera for object analysis, determine that the first video camera has more adequate video coverage than the second video camera.

For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

FIG. 1 is a diagram of a communication system 100 according to one example embodiment. In the example illustrated, the communication system 100 includes a communication device 105 and a local server 110 communicatively coupled to the communication device 105. The communication system 100 may also include a first video camera 115A and a second video camera 115B. In the following description, when explaining how a single video camera 115 functions, a reference to video camera 115 may be used. However, as indicated in FIG. 1, it is not necessary that the video cameras 115A and 115B are identical. In some embodiments, the video cameras 115 are part of a surveillance system that monitors a security site 120 such as the inside and/or outside of a building, an outdoor property, a construction site, and/or the like. The video cameras 115 are merely examples. In some embodiments, the communication system 100 may include more or fewer video cameras 115 than illustrated in FIG. 1. The surveillance system may include any one or more of a number of different types of video cameras including, but not limited to, pan-tilt-zoom (PTZ) cameras (see second video camera 115B), ceiling-mounted or wall-mounted cameras (see first video camera 115A), indoor or outdoor cameras, floodlight cameras, doorbell cameras, fisheye cameras, and/or the like.

In some embodiments, the communication device 105 is a handheld communication device, for example, a mobile telephone or other portable communication device, mobile vehicular radio, laptop computer, tablet computer, smart watch or other smart wearable, or may be another user equipment (UE) device configured to communicate with other devices included in the communication system 100. In some embodiments, the communication device 105 is a desktop computer located at the security site 120. As indicated in FIG. 1, the communication device 105 may be connected to the server 110 via a wired connection. In other embodiments, the communication device 105 may be connected to the server 110 via a wireless connection. In yet other embodiments, the functionality of the server 110 described herein is performed by the communication device 105 such that a separate server 110 is not present in the communication system 100.

As illustrated in FIG. 1, the communication system 100 may also include a cloud-based electronic computing (CEC) device 125. In some embodiments, the CEC device 125 includes one or more electronic processors located at the same location or at distributed locations. For example, the CEC device 125 may include one or more servers remote from the security site 120 that are configured to analyze and/or store video footage obtained by the video cameras 115. In some embodiments, the communication device 105 and/or local server 110 may additionally or alternatively analyze and/or store video footage obtained by the video cameras 115. The CEC device 125 (and/or the communication device 105 and/or the server 110) may include a video analytics engine configured to perform video analytics on video footage/data and/or execute at least some of the methods described herein. In some embodiments, the CEC device 125 includes a software application that controls other integrated or separate cloud-based processing devices to perform certain tasks. One or more elements of the CEC device 125 may be implemented as a discrete network element on a dedicated hardware, as a software instance running on dedicated hardware, or as a virtualized function instantiated on an appropriate platform, e.g., dedicated hardware or a cloud-based computing infrastructure.

As illustrated in FIG. 1, the CEC device 125, the communication device 105, and/or the server 110 may be configured to communicate with each other (for example, by sending and receiving radio signals to and from a base station of a communication network). In some embodiments, at least some of the video cameras 115 are configured to communicate with the CEC device 125 and/or the communication device 105/server 110. In some embodiments, video footage (e.g., video data, image data, video/image data and corresponding audio data, and/or the like) captured by one or more video cameras 115 is transmitted to the CEC device 125 directly from the video cameras 115 and/or is transmitted to the CEC device 125 from the video cameras 115 via the communication device 105 and/or server 110.

In an example embodiment, the communication network that allows for bidirectional communication between the CEC device 125 and local devices 105, 110, and 115 located at the security site is a 5G/LTE communication network. However, other communication networks may also be used. The communication network may include wireless and wired portions. All or parts of the communication network may be implemented using various existing or future-developed specifications or protocols. In some embodiments, the communication network is implemented using a direct-mode, conventional, or trunked land mobile radio (LMR) standard or protocol, for example, a Digital Mobile Radio (DMR) standard defined by the European Telecommunications Standards Institute (ETSI), a Project 25 (P25) standard defined by the Association of Public Safety Communications Officials International (APCO), a Terrestrial Trunked Radio (TETRA) standard defined by the European Telecommunications Standards Institute (ETSI), or other LMR radio protocols or standards. In some embodiments, the communication network implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The communication network may also include future developed networks. In some embodiments, the communication network may also include a combination of the networks mentioned.

In some embodiments, at least some of the local devices 105, 110, and 115 may be configured to communicate directly with each other using a communication channel or connection that is outside of the 5G/LTE communication network. In some embodiments, the local devices 105, 110, and 115 may communicate with each other via wired or wireless connections, for example, over a local network that may be similar to the communication network described immediately above. In some embodiments, the local network may be a local area network (LAN). In some embodiments, at least some of the local devices 105, 110, and 115 may communicate directly with each other when they are within a predetermined distance from each other using short-range communication mechanisms such as Bluetooth® or WiFi communication links.

FIG. 1 illustrates only one example embodiment of the communication system 100. In other embodiments, the system 100 may include more or fewer components and may perform functions that are not explicitly described herein. For example, the communication system 100 may include additional communication devices 105, servers 110, video cameras 115, and CEC devices 125. As another example, while shown as a single entity in FIG. 1, the CEC device 125 may include numerous separate cloud-based components. The lightning bolts in FIG. 1 represent communication capability between devices shown in FIG. 1. Such communication may occur wirelessly in some situations and may occur over wired connections between the devices in other situations.

Figure 2:
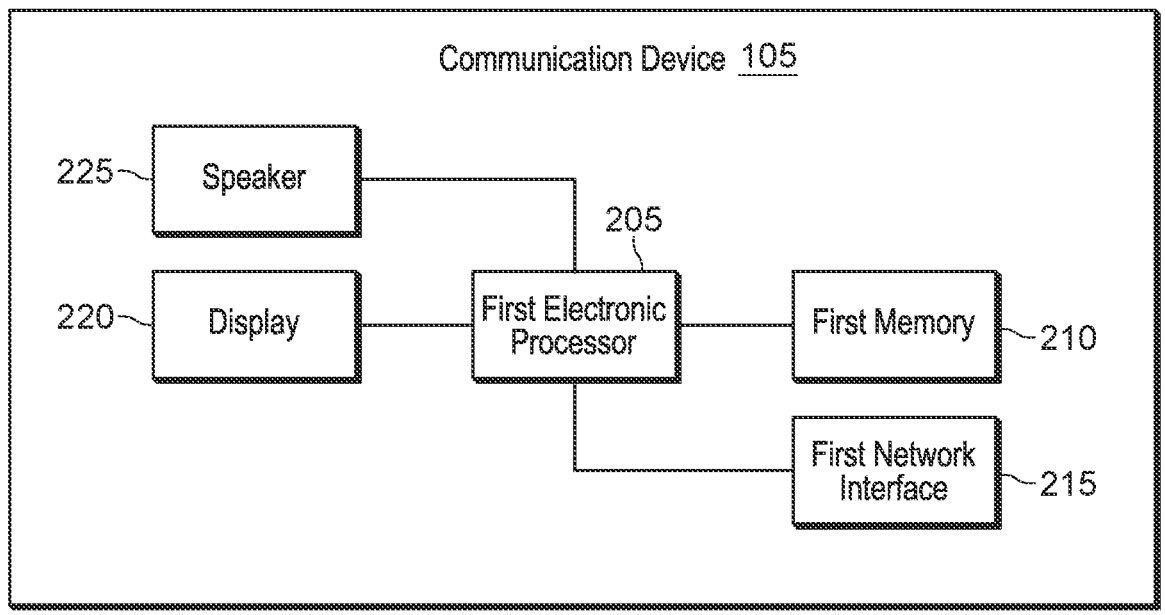
FIG. 2 is a block diagram of a communication device included in the communication system of FIG. 1 according to one example embodiment.

FIG. 2 is a block diagram 200 of a communication device 105 of the communication system 100 according to one example embodiment. In the example shown, the communication device 105 includes a first electronic processor 205 (for example, a microprocessor or another electronic device). The first electronic processor 205 may include input and output interfaces (not shown) and be electrically connected to a first memory 210, a first network interface 215 including a transceiver and an antenna, a display 220, and a speaker 225.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform at least some of the methods described herein.

The first network interface 215 may send and receive data to and from other devices in the communication system 100 (for example, directly and/or over the communication network described previously herein). For example, the first network interface 215 includes a wireless Radio Frequency (RF) communication transceiver and an antenna, for example a RF antenna, for wirelessly communicating with other devices. Alternatively or in addition, the first network interface 215 may include a connector or port for receiving a wired connection to one or more communication networks, such as an Ethernet cable. The first electronic processor 205 may communicate information (e.g., stored video footage, user inputs received on the communication device 105, etc.) through the first network interface 215 (for example, to a video camera 115 or to the CEC device 125). Similarly, the first electronic processor 205 may output data received via the first network interface 215 (for example, video/audio footage/data from a video camera 115) using the speaker 225, the display 220 (which may include a touchscreen), or a combination thereof. In some embodiments, a user interface of the communication device 105 may include one or more output devices that provide output to a user (e.g., the display 220, the speaker 225, etc.) and one or more input devices that receive input from the user (e.g., a microphone, the display 220 embodied as a touchscreen, etc.).

In some embodiments, the communication device 105 may include fewer or additional components in configurations different from that illustrated in FIG. 2. For example, in some embodiments, the UE device 105 also includes one or more of a microphone, a camera, and a location component (for example, a global positioning system (GPS) receiver). In some embodiments, the UE device 105 performs at least one additional functionality than the functionality described herein.

In some embodiments, the first network interface 215 may be configured to communicate over one or more different wireless communication networks or using different wireless communication protocols. For example, the network interface 215 may include multiple RF transceivers and/or multiple RF antennas to allow for communication over different types of wireless communication networks/protocols. In some embodiments, the network interface 215 includes multiple RF transceivers to allow for communication over different types of wireless communication networks/protocols but each transceiver may be configured to use the same RF antenna to engage in such communications. In some embodiments, a single RF transceiver may be configured to allow for communication over different types of wireless communication networks/protocols.

Figure 3:
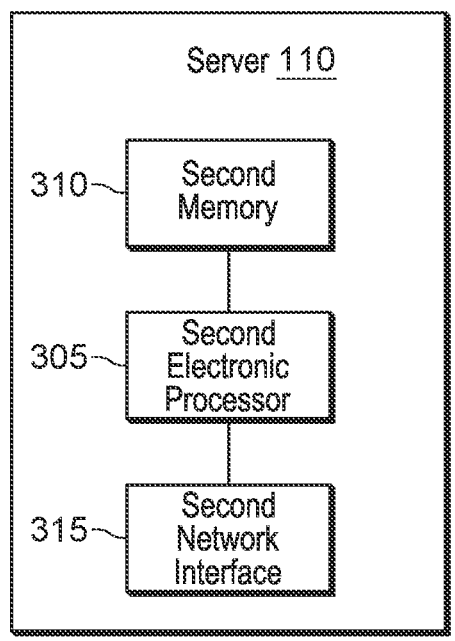
FIG. 3 is a block diagram of a local server included in the communication system of FIG. 1 according to one example embodiment.

FIG. 3 is a block diagram 300 of the server 110 according to one example embodiment. The components shown in FIG. 3 are similar to the like-named components described above with respect to the communication device 105 and perform similar general functions. Accordingly, in some embodiments, the server 110 may include at least some similar components and functionality (e.g., data storing capabilities and data communication capabilities) as the communication device 105. In some embodiments, the network interface 315 is configured to communicate with nearby devices 105, 115, with the CEC device 125, and/or with other devices of the communication system 100 to receive, store, and transmit information (e.g., captured video footage/data from video cameras 115).

In some embodiments, the communication device 105 provides an input/output interface for the server 110 (e.g., to allow a user to access information stored on the server 110 or indicate information that is to be stored on the server 110). In some embodiments, the functionality of the server 110 described herein may be performed by the communication device 105 such that a separate server 110 is not present in the communication system 100.

In some embodiments, the server 110 may include fewer or additional components in configurations different from that illustrated in FIG. 3. In some embodiments, the server 110 performs at least an additional functionality than the functionality described herein.

Figure 4:
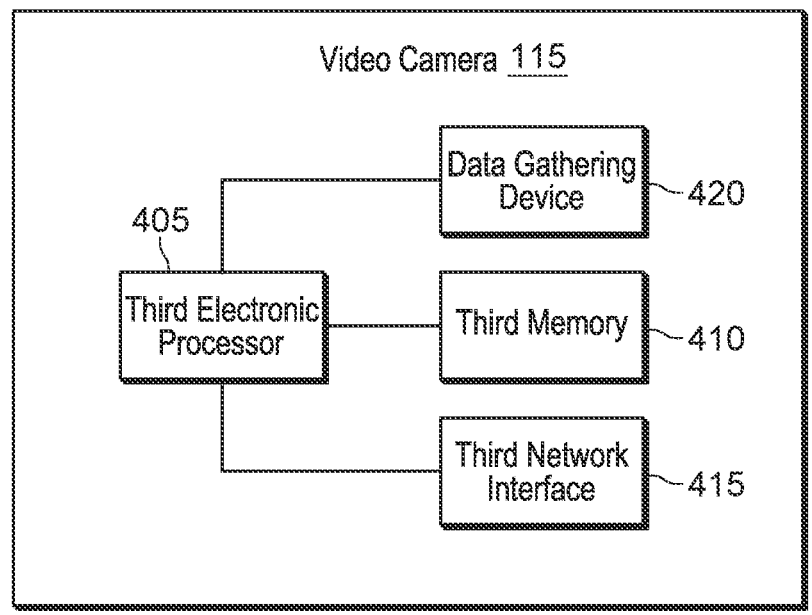
FIG. 4 is a block diagram of a video camera included in the communication system of FIG. 1 according to one example embodiment.

FIG. 4 is a block diagram 400 of the video camera 115 according to one example embodiment. In the example illustrated, the video camera 115 includes a third electronic processor 405, a third memory 410, a third network interface 415 (for example, including a transceiver and an antenna), and one or more data gathering devices 420. The components shown in FIG. 4 are similar to the like-named components described above with respect to the communication device 105 and perform similar general functions. Accordingly, in some embodiments, the video cameras 115 may include at least some similar components and functionality (e.g., data communication capabilities) as the communication devices 105. In some embodiments, the network interface 415 is configured to communicate with nearby devices 105, 110 and with the CEC device 125.

In some embodiments, the data gathering device 420 includes a camera (e.g., a visible-light camera, a thermal camera, an infrared camera, and/or the like). In some embodiments, one or more video cameras 115 include additional data gathering devices 420 such as an air quality sensor (e.g., a smoke detector, a carbon monoxide detector, or the like), a microphone, a moisture sensor, a temperature sensor, a motion detector, and/or any other sensor/device configured to gather data with respect to the surroundings of the video camera 115. In some embodiments, the video camera 115 includes a lighting device (e.g., a flood light). In some embodiments, the video camera 115 may activate its camera and/or its lighting device in response to detecting motion using a motion sensor.

In some embodiments, the video cameras 115 are configured to capture video footage with the data gathering device 420 (i.e., a camera) and transmit the video footage to other devices in the communication system 100 as explained previously herein. The video cameras 115 may be configured to capture and transmit other data associated with the video footage such as audio data that may be contemporaneously captured with the video footage. In some embodiments, the video cameras 115 are configured to generate and transmit metadata associated with captured video footage and/or other captured data such as (i) time stamping captured video footage; (ii) including a location of the video camera 115 where the video footage was captured in the metadata; (iii) including a make, model, maintenance history, and/or performance characteristics/settings of the video camera 115 in the metadata; (iv) including the types of data gathering devices 420 of the video camera 115 in the metadata; and/or the like. Additionally, data captured by other data gathering devices 420 may be included in the metadata associated with captured and/or transmitted video footage (e.g., a temperature at the time the video footage was captured).

In some embodiments, the video camera 115 may include fewer or additional components in configurations different from that illustrated in FIG. 4. For example, in some embodiments, the video camera 115 also includes a location component (for example, a GPS receiver). As another example, some video cameras 115 may include multiple data gathering devices 420 while other video cameras 115 include a camera as their sole data gathering device 420. In some embodiments, one or more video cameras 115 performs at least one additional functionality than the functionality described herein.

As explained previously herein, the video cameras 115A and 115B may be different and may include different components. For example, one video camera 115 may have different data gathering devices 420 than another video camera 115. Continuing this example, one video camera 115 may have a higher quality camera (e.g., a higher resolution) than another video camera 115. FIG. 4 may generally represent multiple types of video cameras 115 including legacy/existing video cameras 115 that a user desires to replace as well as new video cameras 115 that the user desires to use as replacement video cameras 115 to replace the legacy/existing video cameras 115 in a surveillance system.

Figure 5:
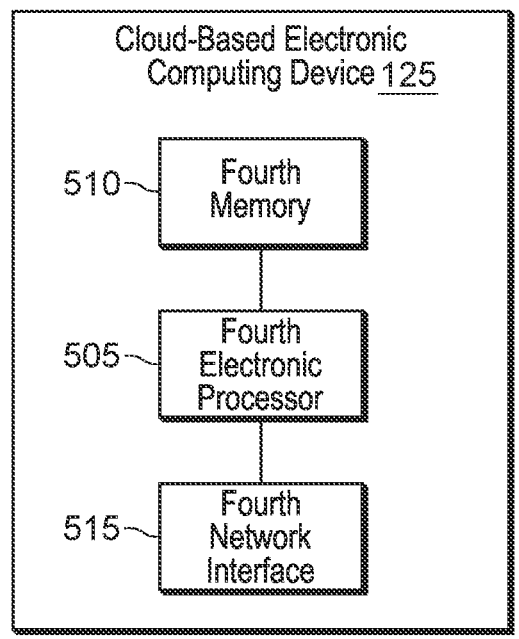
FIG. 5 is a block diagram of a cloud-based electronic computing (CEC) device included in the communication system of FIG. 1 according to one example embodiment.

FIG. 5 is a block diagram 500 of the CEC device 125 according to one example embodiment. In the example illustrated, the CEC device 125 includes one or more computers that include a fourth electronic processor 505, an optional input/output interface (not shown), a fourth memory 510, and a fourth network interface 515 (for example, including an RF transceiver and an RF antenna). These components are similar to those described above with respect to the communication device 105 and perform similar general functions. The CEC device 125 may include a physical device and/or a virtual device, such as one or more servers located remotely from the security site 120. In various examples, the CEC device 125 may be a specialized computer or any machine capable of executing instructions (sequential or otherwise) that specify actions to be taken by that machine. In some embodiments, the functionality of the fourth electronic processor 505 is implemented by one or more electronic processors located at the same or different locations. In other words, while FIG. 5 shows a single fourth electronic processor 505, the fourth electronic processor 505 may be representative of electronic processors of multiple distributed cloud devices (e.g., a video analytics processing device configured to analyze video data).

In some embodiments, the CEC device 125 communicates with other devices of the communication system 100 to receive, store, and process/analyze information (e.g., video footage captured by the video cameras 115 and associated metadata) and to control and/or influence operation of other devices (e.g., to control output of information to a user via the communication device 105) as explained in greater detail below.

In some embodiments, the CEC device 125 may include fewer or additional components in configurations different from that illustrated in FIG. 5. In some embodiments, the CEC device 125 performs at least an additional functionality than the functionality described herein.

As explained previously herein, there is a technological problem with respect to determining which video cameras of a surveillance system to replace in order to provide enhanced surveillance of the security site in a practical manner and/or improved performance of a surveillance system. To address this technological problem, one or more devices of the communication system 100 may perform the methods explained below to determine which video camera(s) of a surveillance system to replace in order to provide enhanced surveillance of the security site in a practical manner and/or improved performance of a surveillance system.

Figure 6:
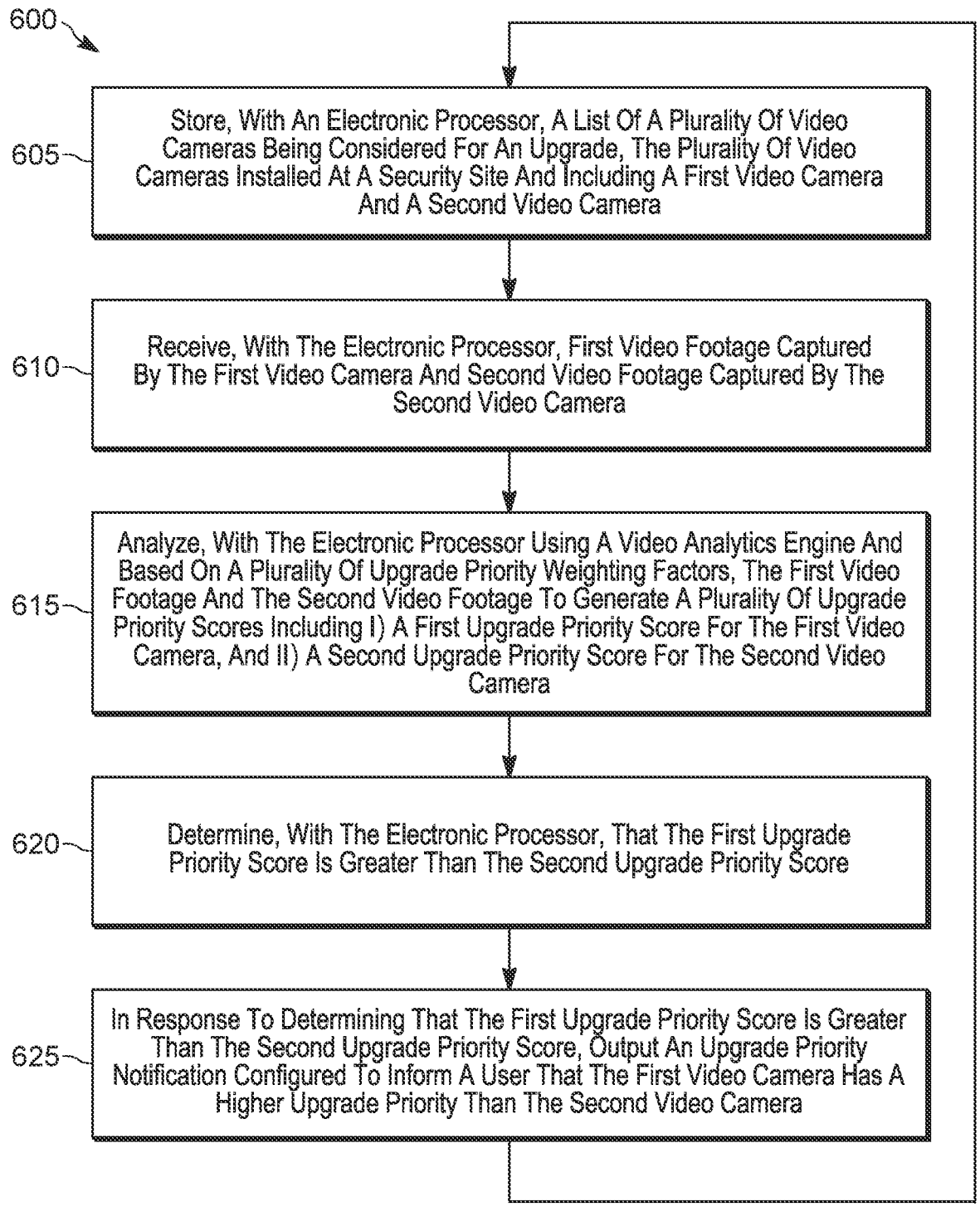
FIG. 6 is a flowchart of a method for identifying a video camera of a surveillance system to be upgraded according to one example embodiment.

FIG. 6 is a flowchart of a method 600 for identifying a video camera 115 to be upgraded according to one example embodiment. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure.

In some embodiments, the method 600 is performed by the CEC device 125, and, specifically, the fourth electronic processor 505, which may include one or more distributed electronic processors. In some embodiments, the method 600 is performed by the communication device 105 and/or the server 110 (i.e., the respective electronic processor 205, 305 of each device). In some embodiments, the method 600 is performed by a combination of the CEC device 125, the communication device 105, and the server 110. Regardless of which specific devices perform all or portions of the method 600, an entity performing the method 600 may be referred to as an electronic computing device. In other words, the electronic computing device may include one or more electronic processors within the same device or distributed at different locations/devices. For example, the electronic computing device may be located in the cloud (e.g., the CEC device 125), at the security site 120 (e.g., communication device 105 and/or server 110), or a combination of both. For the sake of readability, the below description of the method 600 assumes that the fourth electronic processor 505 of the CEC device 125 performs the method 600, for example, after receiving video footage captured by a plurality of video cameras 115.

An instance of the method 600 begins at block 605, where the fourth electronic processor 505 stores, in the fourth memory 510, a list of a plurality of video cameras 115 being considered for an upgrade. The plurality of video cameras 115 may be installed at the security site 120 and may include the first video camera 115A and the second video camera 115B as indicated in FIG. 1. In some embodiments, the list of the plurality of video cameras 115 includes all video cameras 115 that are part of a surveillance system at the security site 120. In other embodiments, the list of the plurality of video cameras 115 includes a subset of the video cameras 115 that are part of the surveillance system at the security site 120. For example, a user may input the list of the plurality of video cameras 115 into the communication device 105 to be transmitted to the CEC device 125. The inputted list of the plurality of video cameras 115 may indicate which video cameras 115 that the CEC device 125 should evaluate against one another to identify an upgrade priority for each listed video camera 115 and ultimately make a surveillance system upgrade recommendation as described herein.

At block 610, the fourth electronic processor 505 receives, via the fourth network interface 515, first video footage captured by the first video camera 115A and second video footage captured by the second video camera 115B. The first video footage and the second video footage may be transmitted to the CEC device 125 as explained previously herein. In some embodiments, the first and second video cameras 115 may capture and/or generate additional associated/related data such as audio data, metadata, and/or the like that is transmitted to the CEC device 125 as explained previously herein.

In some embodiments, the user may select a time range of the first and second video footage to be analyzed by the CEC device 125. For example, the user may provide a user input on the communication device 105 to indicate a time of day during which there is more movement/action occurring at the security site 120 than other times of the day. In some embodiments, the user may not select the time range of the first and second video footage to be analyzed. Instead, the electronic computing device may be configured to determine a time range of the first video footage and the second video footage to analyze in response to identifying one or more motion events in at least one of the first video footage and the second video footage. For example, upon receiving the first and second video footage, the fourth electronic processor 505 may utilize a video analytics engine to determine when motion of one or more objects is frequently detected in one or both of the first video footage and the second video footage. The fourth electronic processor 505 may log one or more time ranges associated with such motion and identify these one or more time ranges as the time ranges during which the first, second, and any other video footage should be analyzed.

At block 615, the fourth electronic processor 505 uses a video analytics engine to analyze, based on a plurality of upgrade priority weighting factors, the first video footage and the second video footage to generate a plurality of upgrade priority scores including i) a first upgrade priority score for the first video camera 115A, and ii) a second upgrade priority score for the second video camera 115B. For example, the fourth electronic processor 505 analyzes the first video footage and the second video footage during the time range(s) determined or received during the performance of block 610 described above.

In some embodiments, the upgrade priority score may include multiple types of sub-scores. Each of the sub-scores may indicate a priority of taking a different upgrade action with respect to a respective video camera 115. In one example embodiment, the types of sub-scores include: (A) a sub-score indicating a priority of replacing the existing video camera 115 with an analytics-enabled camera 115; (B) a sub-score indicating a priority of replacing the existing video camera 115 with a higher resolution camera; (C) a sub-score indicating a priority of continuing to use the existing video camera 115 while providing its captured footage through a video analytics engine at the electronic computing device; (D) a sub-score indicating a priority of replacing the existing video camera 115 with a different video camera 115 that has better performance in certain situations (e.g., better low-light performance); (E) a sub-score indicating a priority of adding a new video camera 115 (e.g., an analytics-enabled camera 115) to a certain location at the security site 120; and (F) a sub-score indicating a priority of adding artificial illumination (e.g., infrared illuminators, lighting devices to provide visible light, and/or the like) to a certain location at the security site 120.

Sub-scores (A) through (D) may relate to a particular existing video camera 115 within a surveillance system while sub-score (E) may not relate to a particular existing video camera 115 within the surveillance system. Instead, sub-score (E) may apply to the surveillance system in general. Sub-score (F) may also apply to one or more particular existing video cameras 115 within the surveillance system. For example, adding a lighting device to a certain location at the security site 120 may improve the quality of video footage captured by one or more particular video cameras 115.

In some embodiments, a range of possible upgrade priority sub-scores for each sub-score may be between negative ten and positive ten with a score of zero being a low upgrade priority sub-score that indicates that the specific upgrade action represented by the sub-score has a low priority. On the other hand, a score of negative ten or positive ten may be a high upgrade priority sub-score that indicates that the specific upgrade action represented by the sub-score has a high priority. In some embodiments, a score may be increased in response to determining that a factor indicates that it is more likely that the video camera 115 should be replaced. Along similar lines, in some embodiments, a score may be decreased in response to determining that a factor indicates that it is less likely that the video camera 115 should be replaced. Thus, in some embodiments, a score of positive ten may be a high upgrade priority sub-score that indicates that replacement of the video camera 115 is highly recommended while a score of negative ten may also be a high upgrade priority sub-score, but the negative ten score indicates that not replacing the video camera 115 is highly recommended.

In some embodiments, for each video camera 115 of a surveillance system, the sub-scores may initially start at zero and may be increased and/or decreased by the fourth electronic processor 505 according to analysis of video footage from one or more video cameras 115, analysis of metadata associated with the video footage and/or video cameras 115, and/or analysis of other information regarding the video footage, the video cameras 115, and/or the security site 120. For example, each of the first video camera 115A and the second video camera 115B may be initialized with sub-scores (A)-(D) and (F) that are zero that are then adjusted by the fourth electronic processor 505 based on a plurality of upgrade priority weighting factors.

In some embodiments, the plurality of upgrade priority weighting factors used by the video analytics engine to analyze the first and second video footage and determine the upgrade priority sub-scores includes details about the video cameras 115 themselves. For example, the fourth electronic processor 505 is configured to determine that the first video camera 115A and the second video camera 115B are not configured to utilize video analytics to analyze video footage respectively captured by the first video camera 115A and the second video camera 115B. For example, metadata received with the first and second video footage may indicate that the video cameras 115A and 115B are non-video analytics cameras or video cameras 115 with old/outdated video analytics capabilities. In other words, the electronic processors 405 of the video cameras 115A and 115B may not be programmed to perform video analytics such as detecting specific types of objects, determining and/or recording motion and/or attributes of objects, performing facial recognition, performing license plate recognition, performing other object analysis, and/or the like. In some embodiments, the fourth electronic processor 505 may determine that the video cameras 115A and 115B are non-video-analytics cameras based on information transmitted from the communication device 105 in response to a user input. In some embodiments, the fourth electronic processor 505 may determine other operational characteristics/properties/settings of the video cameras 115 in similar manners as described above.

In some embodiments, the fourth electronic processor 505 may increase one or more upgrade priority sub-scores (e.g., increase sub-score (A) by three points) of a video camera 115 in response to determining that the video camera 115 is not configured to utilize video analytics to analyze video footage because such a characteristic tends to indicate that the video camera 115 should be replaced, for example, with a video analytics-enabled video camera 115. Continuing this example, the fourth electronic processor 505 may further adjust one or more upgrade priority sub-scores (e.g., increase sub-score (A) by another three points and decrease sub-score (C) by three points) of the video camera 115 in response to determining that motion of objects (e.g., people, vehicles, and/or the like) is included within the video footage of the video camera 115 at or above a predetermined threshold frequency (e.g., once per minute, once per ten minutes, etc.). Such a characteristic indicates that the video camera 115 is configured to monitor an area that experiences at least some traffic that may be relevant to monitor. Further continuing this example, upon the analysis of all video footage from all video cameras 115 in the surveillance system being completed, the fourth electronic processor 505 determine that one or more of the objects included in the video footage of a certain video camera 115 was not included in the video footage of any other video cameras 115 of the surveillance. In response thereto, the fourth electronic processor 505 may further increase sub-score (A) of the certain video camera 115 by four points. In such a situation, the video footage of the certain video camera 115 may be particularly useful since it is the only video camera 115 in the surveillance system that captured video footage of the one or more objects.

In some embodiments, the plurality of upgrade priority weighting factors used by the video analytics engine to analyze the first and second video footage and determine the upgrade priority sub-scores includes one or more of a frequency at which objects are respectively detected within the first video footage and the second video footage; a distance from the respective video camera 115 that captured the footage at which the objects are respectively detected within the first video footage and the second video footage; a respective quality level of the first video footage and the second video footage; a respective suitability level of the first video footage and the second video footage for object analysis; and a respective cost associated with upgrading the first video camera 115A and the second video camera 115B. Examples of each of these factors are explained below.

In some embodiments, object analysis may be performed on video footage by the fourth electronic processor 505 and may include, but is not limited to, object detection (e.g., detecting objects of specific types (people, vehicles, etc.)), object classification (e.g., identifying attributes of an object such as clothing color, hair color, presence/absence of glasses, vehicle type, vehicle color, etc)), object recognition (e.g., uniquely identifying a specific instance of an object (facial recognition, license plate recognition, etc)), and/or the like.

Other upgrade priority weighting factors for each video camera 115 may include a type of video camera 115 (e.g., an explosion-proof camera, a weatherproof camera, a regular indoor security camera, etc.), a location of the video camera 115 (e.g., whether the video camera 115 is located in an easily accessible location or a location that is difficult or most expensive to access should the video camera 115 be replaced), and an age of the video camera 115 (e.g., when the video camera 115 was installed, an age of a model of the video camera 115 regardless of when it was installed, etc.).

In some embodiments, these other upgrade priority weighting factors overlap with previously-mentioned factors. For example and as indicated in the below examples, the type of existing video camera 115 and the location of the existing video camera 115 may impact a cost associated with upgrading the existing video camera 115. Similarly, an age of the existing video camera 115 may indicate a quality level of video footage that can be captured by the existing video camera 115.

As an example of using a frequency at which objects are respectively detected within the first video footage and the second video footage, the fourth electronic processor 505 may adjust one or more upgrade priority sub-scores (e.g., increase sub-score (A) and/or decrease sub-score (C)) of the video camera 115 in response to determining that motion of objects (e.g., people, vehicles, and/or the like) is included within the video footage of the video camera 115 at or above a predetermined threshold frequency (e.g., once per minute, once per ten minutes, etc.). In some embodiments, the increase/decrease in the sub-score(s) may be proportionate to the frequency at which objects are detected within the video footage. For example, when an object is detected in the video footage at an average of once or more every two minutes, the fourth electronic processor 505 may increase the sub-score (A) and/or decrease the sub-score (C) by five points. However, when an object is detected in the video footage at an average of once every ten minutes, the fourth electronic processor 505 may increase the sub-score (A) and/or decrease the sub-score (C) by only one point. In some embodiments, the frequency at which objects are respectively detected within the first video footage and the second video footage is determined over the same time period during which the video footage of each video camera 115 was captured. In other embodiments, the frequency at which objects are respectively detected within the first video footage and the second video footage may be detected over different time periods of the same or different lengths.

As an example of using a distance from the video camera 115 that captured the footage at which the objects are respectively detected within the first video footage and the second video footage, the fourth electronic processor 505 may adjust one or more upgrade priority sub-scores (e.g., increase sub-score (A) and/or decrease sub-score (C) by three points) of the video camera 115 in response to determining that an object is detected within the video footage at a distance such that video analytics can be used to identify the object. On the other hand, the fourth electronic processor 505 may instead increase one or more other upgrade priority sub-scores (e.g., increase sub-score (B) and/or (E) by three points) of the video camera 115 in response to determining that an object is detected within the video footage at a distance such that video analytics cannot be used to identify the object at all or without computationally intensive long-range detection. In some embodiments, the increase in the sub-score(s) may be proportionate to the distance from the video camera 115 at which the objects are detected within the video footage.

In some embodiments, the distance of detected objects from the video camera 115 may form a part of the more general upgrade priority weighting factor of a respective suitability level of the first video footage and the second video footage for object analysis (i.e., a suitability level of a respective field of view of the first video camera and the second video camera for object analysis). For example, this suitability level factor may also consider a viewing angle of the video camera 115 when determining the suitability level of the video footage to be used for object analysis. In other words, this suitability level factor may function similarly as the distance factor explained above but may take into account distance and viewing angle, among other things, when determining whether video cameras 115 are well-equipped to provide video footage that can be used for object analysis by the video analytics engine. For example, the fourth electronic processor 505 may adjust one or more upgrade priority sub-scores (e.g., increase sub-score (A) and/or decrease sub-score (C) by three points) of the video camera 115 in response to determining that video footage is suitable for video analytics to be used to identify an object (e.g., a face, a license plate, etc.) because the video footage provides a clear view of faces and/or license plates. In some embodiments, the increase in the sub-score(s) may be proportionate to the suitability of the video footage captured by the video camera 115 to be used for object analysis.

As indicated by the above examples, in some embodiments, the electronic processor is configured to determine the suitability level of the respective field of view of the first video camera 115A and the second video camera 115B for object analysis based on (i) a distance from the respective video camera 115 that captured the respective video footage at which the objects are detected within the respective footage and/or (ii) a viewing angle of the respective video camera 115 with respect to the objects included in the respective video footage. For example, an average, median, etc. distance of detected objects from the video camera 115 may be determined to further determine whether the average, median, etc. distance is approximately equal to a desired distance for accurate object analysis or within a predetermined range of distances that allows for accurate object analysis. Similarly, an average, median, etc. viewing angle of detected objects (e.g., faces, license plates, etc.) may be determined to further determine whether the average, median, etc. viewing angle is approximately equal to a desired viewing angle for accurate object analysis or within a predetermined range of viewing angles that allows for accurate object analysis.

In some embodiments, the closer the values of (i) viewing distance and (ii) viewing angle are to the respective desired values, the higher the suitability level of the respective video camera 115 for object analysis. In some embodiments, the desired values may be pre-programmed into the fourth memory 510. In other embodiments, the desired values may be received from the communication device 105 in response to a user input. In yet other embodiments, a set of desired values from a plurality of sets of desired values may be retrieved based on the properties/settings of a replacement video camera 115 that is intended to replace one or more of the first video camera 115A and the second video camera 115B.

In some embodiments, at block 615, the fourth electronic processor 505 analyzes the first video footage and the second video footage to determine an adequacy of video coverage of each of the first video camera 115A and the second video camera 115B. The adequacy of video coverage may be determined based on (i) a frequency at which objects are respectively detected within the first video footage and the second video footage and (ii) a suitability level of a respective field of view of the first video camera 115A and the second video camera 115B for object analysis.

As an example of using a respective quality level of the first video footage and the second video footage (e.g., focus, contrast, dynamic range, resolution, and/or other camera characteristics), the fourth electronic processor 505 may decrease one or more upgrade priority sub-scores (e.g., sub-score (C) by two points) of the video camera 115 in response to determining that the video camera 115 has a resolution or other camera characteristic above a predetermined threshold. On the other hand, the fourth electronic processor 505 may instead adjust one or more other upgrade priority sub-scores (e.g., increase sub-scores (A) and/or (B) by two points) of the video camera 115 in response to determining that the video camera 115 has a resolution or other camera characteristic below the predetermined threshold. In some embodiments, the increase in the sub-score(s) may be proportionate to the resolution or other camera characteristic of the video camera 115.

As an example of using a respective cost associated with upgrading the first video camera 115A and the second video camera 115B, the fourth electronic processor 505 may adjust one or more upgrade priority sub-scores (e.g., decrease sub-score (C) by four points) of the video camera 115 in response to determining that the video camera 115 is a specialized video camera that has a cost value above a predetermined threshold value and/or would need to be replaced by a video camera 115 with a cost value above a predetermined threshold value (e.g., an expensive explosion-proof camera). As another example, the fourth electronic processor 505 may additionally or alternatively decrease the sub-score (C) by four points in response to determining that the video camera 115 is located in difficult area to access such that an estimated cost of replacing the video camera 115 is above a predetermined threshold value (e.g., when the video camera 115 is located in an area where traffic would need to be rerouted to replace the video camera 115). On the other hand, the fourth electronic processor 505 may instead adjust one or more other upgrade priority sub-scores (e.g., increase sub-scores (A) and/or (B) by two points) of the video camera 115 in response to determining that the video camera 115 has a cost value below the predetermined threshold value and/or in response to determining that the recommended replacement video camera 115 has a cost value below the predetermined threshold value. Similarly, the fourth electronic processor 505 may adjust one or more other upgrade priority sub-scores (e.g., increase sub-scores (A) and/or (B) by two points) of the video camera 115 in response to determining that the video camera 115 is located in an easy area to access such that an estimated cost of replacing the video camera 115 is below the predetermined threshold value (e.g., a security camera on a private property with little traffic). In some embodiments, rather than increasing sub-scores (A) and/or (B), the fourth electronic processor 505 may not adjust any sub-scores in response to determining that the value of the existing camera 115 and/or the recommended replacement camera 115 are below the threshold value and/or in response to determining that the estimated cost of replacing the existing video camera 115 is below the threshold value. In some embodiments, the increase in the sub-score(s) may be proportionate to the estimated value/cost of the existing video camera 115 and/or the recommended replacement video camera 115. In some embodiments, the increase in the sub-score(s) may be proportionate to the estimated value/cost of replacing the existing video camera 115 in view of the accessibility level of the existing video camera 115.

With respect to sub-score (E) that is not specific to a particular existing video camera 115, the fourth electronic processor 505 may increase the sub-score (E) for a given area within the security site 120 each time video footage from any video camera 115 is determined to include one or more people or one or more vehicles within the given area, but the video footage does not capture a face or license plate of the person/vehicle at all or well enough to allow the fourth electronic processor 505 to perform object analysis using the video analytics engine. On the other hand, the fourth electronic processor 505 is configured to decrease the sub-score (E) by the same amount that it was increased in response to identifying the same person or vehicle in video footage from another camera if this other video footage allows the fourth electronic processor 505 to perform object analysis using the video analytics engine. Once the video footage of all desired existing video cameras 115 has been analyzed for all desired time ranges, the fourth electronic processor 505 may determine the total sub-score (E) for one or more areas of the security site 120 as adjusted based on all analyzed video footage. In some embodiments, the higher the sub-score (E), the greater priority it is to install an additional video camera 115 at the given area of the security site 120 to, for example, provide the fourth electronic processor 505 video footage to be able to perform object analysis on objects determined to be present at the security site 120 but that are unidentifiable using video footage of existing video cameras 115.

In accordance with at least some of the above-explained examples, Table 1 includes a number of example situations that may be detected by the video analytics engine of the electronic computing device performing the method 600. Table 1 also indicates examples of which sub-scores may be increased in response to each detected situation as well as the rationale for increasing these sub-scores. As indicated in the previous examples and the examples included in Table 1, for some detected situations, the electronic computing device may adjust more than one sub-score, for example, if a detected situation may be addressed by multiple upgrade actions represented by different sub-scores. For example, allowing for the performance of video analytics on video footage of a monitored area may occur for an existing video camera 115 by replacing the existing video camera 115 with an analytics-enabled video camera 115 (associated with an increase to sub-score (A)) or by continuing to use the existing video camera 115 while providing its captured footage to a video analytics engine at the electronic computing device (associated with a decrease to sub-score (C)).

TABLE 1

| Situation detected by video analytics engine | Sub-scores to increase | Rationale for sub-score increase |
|---|---|---|
| Camera is not analytics enabled, but footage includes significant activity (in terms of detectable objects) in the time range of interest | A + C | More likely to produce useful video analytic results |
| Camera not analytics enabled, but footage includes objects that are not included in the footage of any other camera in the surveillance system | A + C | Cameras whose fields of view overlap with each other do not all need to be upgraded, and cameras whose footage provide the sole view of one or more objects may be more useful to upgrade |
| Camera is an old and/or obsolete model | A | If a camera is older and more likely to need replacement soon, put more consideration into replacing that camera |
| Camera is not analytics enabled, but has a vantage point that would provide a good view of faces | A + C | Facial analytics (e.g., facial recognition) are valuable |
| One or more cameras can see people, but none of them have a good view of faces | E | Suggest adding a camera for facial analytics (e.g., facial recognition) |
| Camera is not analytics enabled, but has a vantage point that would provide a good view of license plates | A+C | License plate recognition is valuable |
| One or more cameras can see vehicles, but none have a good view of license plates | E | Suggest adding a camera for license plate recognition |
| People and/or vehicles can be detected in the footage from the existing camera, but only with special processing (e.g. computationally intensive long-range detection) because the resolution of the existing camera is too low | A + B | Sending the low resolution footage of the existing camera to the video analytics engine would not improve the special processing required to analyze the footage. Rather, there is a need for a higher resolution camera to improve/reduce special processing requirements (and, some situations, it also may be useful to make the new camera analytics-enabled). |
| Footage from a camera is dark, grainy and/or blurry during a time period of interest | D + F | Can address by replacing individual camera(s), or by adding external illumination to improve quality of footage of the monitored area |
| Camera is not analytics enabled, but is a highly specialized type of camera (e.g. an expensive "explosion-proof" camera) | C | Replacing entire camera with an analytics-enabled version would be expensive. Thus, it may be better to run footage from the existing camera through a remote analytics server, assuming that the footage is of adequate quality to do so. |
| Camera is not analytics enabled, but is located above (or in narrow median between) heavy vehicle traffic | C | Redirecting traffic to replace a camera is unusually expensive. Thus, it may be better to run footage from the existing camera through a remote analytics server, assuming that the footage is of adequate quality to do so. |

In some embodiments, the upgrade priority sub-scores of each video camera 115 are used to determine the upgrade priority score (i.e., an overall upgrade priority score) of the respective video camera 115. For example, each sub-score (A)-(D) and (F) may be assigned a weighting coefficient. In some embodiments, the fourth electronic processor 505 may multiply each sub-score (A)-(D) and (F) by its respective weighting coefficient and add each of the weighted sub-scores for a certain video camera 115 together to determine the upgrade priority score for the video camera 115.

In some embodiments, the upgrade priority score of a video camera 115 indicates a relative priority of updating the video camera 115 with respect to other video cameras 115 in a surveillance system. For example, higher positive upgrade priority scores of a video camera 115 indicate that the video camera 115 is a better candidate for replacement than video cameras 115 with lower upgrade priority scores. As another example, a more negative upgrade priority score of a video camera 115 indicates that the video camera 115 is a better candidate for maintaining the same video camera 115 but adjusting how it is used (e.g., sending its video footage to be analyzed using video analytics) or making a different upgrade within the surveillance system (e.g., increasing lighting) than video cameras 115 with less negative upgrade priority scores that are closer to zero. In some embodiments, the closer that the upgrade priority score of a video camera 115 is to zero (whether the score is positive or negative), the weaker of a candidate the video camera 115 is for replacement or for some other change within the surveillance system. In other words, in response to determining that a video camera 115 has an upgrade priority score of zero, the fourth electronic processor 505 may determine that no replacement of the video camera 115 is needed and no changes to the operation of the video camera 115 or its environment are needed because the video camera 115 is providing adequate video footage for video analytics analysis and/or is already performing video analytics on its own captured video footage.

In some embodiments, overall upgrade priority scores may not be calculated based on the sum of weighted sub-scores as explained above. Rather, the upgrade priority score of each video camera 115 may include the set of sub-scores (A)-(D) and (F) for each video camera 115. Such embodiments may indicate multiple recommended upgrade actions to be taken to improve the surveillance system. For example, a high sub-score (A) and a high sub-score (F) for a particular video camera 115 may indicate that the particular video camera 115 should be replaced with an analytics-enabled camera 115 and that an illumination device should be installed to better illuminate area being monitored by the particular video camera 115. In some embodiments, the upgrade priority sub-scores of a video camera 115 indicate a relative priority of updating the video camera 115 according to a corresponding upgrade action compared to updating other video cameras 115 according to the corresponding upgrade action associated with a particular sub-score.

At block 620, the fourth electronic processor 505 determines that the first upgrade priority score of the first video camera 115A is greater than the second upgrade priority score of the second video camera 115B. In some embodiments, the fourth electronic processor 505 may compare the overall upgrade priority scores of video cameras 115 to each other. In other embodiments, the fourth electronic processor 505 may additionally or alternatively compare each upgrade priority sub-score for each video camera 115 with a corresponding upgrade priority sub-score for other video cameras 115 of the surveillance system.

In some embodiments, at block 620, the fourth electronic processor 505 determines that the frequency at which objects are detected within the first video footage is greater than or equal to frequency at which objects are detected within the second video footage. Also at block 620, the fourth electronic processor 205 may determine that the suitability level of the field of view of the first video camera 115A for object analysis is greater than the suitability level of the second video camera 115B for object analysis.

At block 625, in response to determining that the first upgrade priority score is greater than the second upgrade priority score, the fourth electronic processor 505 outputs/transmits an upgrade priority notification configured to inform a user that the first video camera 115A has a higher upgrade priority than the second video camera 115B. For example, the fourth electronic processor 505 may transmit the upgrade priority notification to be displayed or otherwise output on the communication device 105. In some embodiments, the upgrade priority notification includes values of the overall upgrade priority scores and/or the upgrade priority sub-scores for the first and second video cameras 115. Such values may allow the user to view a list of scores and sub-scores for each video camera 115 in the surveillance system to aid in deciding on which video camera(s) 115 to perform upgrade actions (e.g., replace the video camera 115 and/or improve in a different manner besides replacement).

In some embodiments, at block 625, in response to determining that (i) the frequency at which objects are detected within the first video footage is greater than or equal to frequency at which objects are detected within the second video footage and (ii) that the suitability level of the field of view of the first video camera 115A for object analysis is greater than the suitability level of the field of view of the second video camera 115B for object analysis, the fourth electronic processor 505 determines that the first video camera 115A has more adequate video coverage than the second video camera 115B.

In some embodiments, the higher upgrade priority (and/or the higher adequacy in video coverage) of the first video camera 115A indicates that replacing the first video camera 115A with a third video camera 115 configured to utilize video analytics (or some other improvement not utilized by the first video camera 115) to analyze video footage captured by the third video camera 115 will result in more robust information about the security site 120 than replacing the second video camera 115B with the third video camera 115. In other words, it is more beneficial and/or cost-effective to replace first video camera 115A than the second video camera 115B.

In some embodiments, the upgrade priority notification includes a listing of all video cameras 115 within the surveillance system as well as their respective overall upgrade priority scores and sub-scores. In some embodiments, the list may be selectably sortable based on the upgrade priority score or based on different sub-scores to allow the user to determine which video cameras 115 are the highest priority for different upgrade actions (e.g., replacement and/or other improvements such adding lighting, transmitting current footage for video analytics analysis, and/or the like). In some embodiments, the upgrade priority notification includes a rationale of why an upgrade priority score or sub-score of a video camera 115 is above a predetermined threshold and/or is greater than that of another video camera 115. For example, the rationales may be similar to the rationales provided in Table 1 above. The rationales may help the user understand why it was determined to be more beneficial from a surveillance and/or cost perspective to replace the video camera 115 (or otherwise improve the surveillance system) as opposed to replacing other video cameras 115 (or otherwise improving other aspects of the surveillance system that are associated with the other video cameras 115).

In some embodiments, the upgrade priority notification includes a list of one or more recommended actions with respect to each video camera 115 in the surveillance system. Each recommended action may have an associated cost. In some embodiments, the list may indicate which recommended action(s) yield the largest improvement to the surveillance system (i.e., largest improvement in video coverage and/or object analysis that can be performed using video footage) given a certain budget/cost constraint.

In some embodiments, the upgrade priority notification includes the sub-score (E) that indicates an upgrade priority of installing an additional video camera 115 at the security site 120 to, for example, provide the fourth electronic processor 505 video footage to be able to perform object analysis on objects determined to be present at the security site 120 but that are unidentifiable using video footage of existing video cameras 115. Along with the sub-score (E), the upgrade priority notification may include one or more locations at the security site 120 where the additional video camera(s) 115 are recommended to be installed. In some embodiments, each recommended location/additional video camera 115 may have its own sub-score (E) to allow the user to determine a highest priority location to add an additional video camera 115.

In some embodiments, the fourth electronic processor 505 is configured to determine that the first upgrade priority score (e.g., a sub-score) of the first video camera 115A is greater than the second upgrade priority score (e.g., a corresponding sub-score) of the second video camera 115B in response to determining (i) that an object included in the first video footage of the first video camera 115A is also included in the second video footage of the second video camera 115B at approximately the same time and (ii) that the first video footage allows for more accurate object analysis of the object than the second video footage. In other words, the fourth electronic processor 505 may detect an area of overlap between the monitored areas of the first and second video cameras 115. The fourth electronic processor 505 may also determine that the first video camera 115A is better equipped to identify objects that are viewable in the area of overlap (e.g., due to a better vantage point, due to higher quality video footage, due to better lighting, etc.). Accordingly, by performing the analysis described above at block 615, the fourth electronic processor 505 may determine that the first upgrade priority score of the first video camera 115A is greater than the second upgrade priority score of the second video camera 115B based on these detected situations in the first and second video footage. Because the first upgrade priority score of the first video camera 115A is greater than the second upgrade priority score of the second video camera 115B, the fourth electronic processor 505 may recommend to only upgrade/replace the first video camera 115A, for example, if the second video camera 115B only provides redundant and less valuable video footage compared to the first video camera 115A. Such a recommendation may be reflected in the upgrade priority scores and/or sub-scores of each video camera 115.

In some embodiments, the upgrade priority notification is configured to indicate that an illumination device should be installed to illuminate at least a portion of a field of view of the first video camera 115A and/or the second video camera 115B. For example and similar to some of the examples included previously herein, when the upgrade priority sub-score (F) that is associated with adding artificial illumination is above a predetermined threshold, the upgrade priority notification may indicate that an illumination device should be added to the surveillance system in addition to or as opposed to replacing the first video camera 115A and/or the second video camera 115B.

As indicated in examples included previously herein, in some embodiments, the upgrade priority notification is configured to indicate that the plurality of upgrade priority weighting factors of the first video footage indicate that analyzing future video footage of the first video camera 115A with the video analytics engine will result in adequate information about the security site 120 without replacing the first video camera 115A. For example, when many objects are detected in the first video footage and/or facial recognition or other object analysis is possible in most situations (e.g., for over 80% of detected objects), the fourth electronic processor 505 may determine that the sub-score (C) associated with transmitting existing footage to be analyzed by a video analytics engine is very high (e.g., a sub-score of nine or ten). This very high sub-score (C) may indicate to the user that analyzing future video footage of the first video camera 115A with the video analytics engine will result in adequate information about the security site 120 without replacing the first video camera 115A. Whether analyzing the future video footage of the first video camera 115A with the video analytics engine will result in adequate information may be determined based on one or more thresholds of video footage quality, object detection frequency, viewing angle/vantage point, etc. as explained previously herein. Based on the high sub-score (C), the electronic computing device may recommend continuing to use the existing video camera 115 while transmitting existing footage to be analyzed by a video analytics engine.

In the examples of the upgrade priority score and sub-score determinations included herein, the point values and score ranges are merely examples and may be different in other embodiments. Additionally, the sub-scores mentioned above are examples. In some embodiments, other sub-scores that represent other recommended upgrade actions may additionally or alternatively be used. Furthermore, different sub-scores may be increased or decreased differently in response to detected situations in the video footage from the video cameras 115 of the surveillance system. In some embodiments, one or more of the parameters used during performance of the method 600 (e.g., point values, score ranges, types of sub-scores, thresholds associated with scores and/or sub-scores, weightings of different sub-scores, etc.) may be adjustable by a user as desired, for example, via a user input on the communication device 105.

While most of the examples included herein refer to first video footage of the first video camera 115A and second video footage of the second video camera 115B, it should be understood that the fourth electronic processor 505 may analyze additional video footage from additional video cameras 115 in a similar manner.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
an electronic processor configured to
store a list of a plurality of video cameras being considered for an upgrade, the plurality of video cameras installed at a security site and including a first video camera and a second video camera,
receive first video footage captured by the first video camera and second video footage captured by the second video camera,
analyze, using a video analytics engine and based on a plurality of upgrade priority weighting factors, the first video footage and the second video footage to generate a plurality of upgrade priority scores including i) a first upgrade priority score for the first video camera, and ii) a second upgrade priority score for the second video camera,
determine that the first upgrade priority score is greater than the second upgrade priority score, and
in response to determining that the first upgrade priority score is greater than the second upgrade priority score, output an upgrade priority notification configured to inform a user that the first video camera has a higher upgrade priority than the second video camera.

2. The electronic computing device of claim 1, wherein the electronic processor is configured to determine that the first video camera and the second video camera are not configured to utilize video analytics to analyze video footage respectively captured by the first video camera and the second video camera.

3. The electronic computing device of claim 1, wherein the higher upgrade priority of the first video camera indicates that replacing the first video camera with a third video camera configured to utilize video analytics to analyze video footage captured by the third video camera will result in more robust information about the security site than replacing the second video camera with the third video camera.

4. The electronic computing device of claim 1, wherein the electronic processor is at least one of a group consisting of (i) located at a cloud-based electronic computing device remote from the security site, and (ii) located at a server located at the security site.

5. The electronic computing device of claim 1, wherein the plurality of upgrade priority weighting factors includes at least one of a group consisting of a frequency at which objects are respectively detected within the first video footage and the second video footage, a distance from the respective video camera that captured the respective footage at which the objects are respectively detected within the first video footage and the second video footage, a respective quality level of the first video footage and the second video footage, a respective suitability level of the first video footage and the second video footage for object analysis, and a respective cost associated with upgrading the first video camera and the second video camera.

6. The electronic computing device of claim 1, wherein the electronic processor is configured to determine that the first upgrade priority score is greater than the second upgrade priority score in response to determining that an object included in the first video footage is also included in the second video footage at approximately the same time; and that the first video footage allows for more accurate object analysis of the object than the second video footage.

7. The electronic computing device of claim 1, wherein the upgrade priority notification is configured to indicate that an illumination device should be installed to illuminate at least a portion of a field of view of the first video camera.

8. The electronic computing device of claim 1, wherein the upgrade priority notification is configured to indicate that the plurality of upgrade priority weighting factors of the first video footage indicate that analyzing future video footage of the first video camera with the video analytics engine will result in adequate information about the security site without replacing the first video camera.

9. The electronic computing device of claim 1, wherein the electronic processor is configured to determine a time range of the first video footage and the second video footage to analyze in response to identifying one or more motion events in at least one of the first video footage and the second video footage.

10. The electronic computing device of claim 1, wherein each of the first upgrade priority score and the second upgrade priority score include a plurality of sub-scores, wherein each of the plurality of sub-scores indicate a respective priority of taking a different upgrade action with respect to the first video camera and the second video camera.

11. A method for identifying a video camera to be upgraded, the method comprising:

storing, with an electronic processor of an electronic computing device, a list of a plurality of video cameras being considered for an upgrade, the plurality of video cameras installed at a security site and including a first video camera and a second video camera, receiving, with the electronic processor, first video footage captured by the first video camera and second video footage captured by the second video camera, analyzing, with the electronic processor using a video analytics engine and based on a plurality of upgrade priority weighting factors, the first video footage and the second video footage to generate a plurality of upgrade priority scores including i) a first upgrade priority score for the first video camera, and ii) a second upgrade priority score for the second video camera, determining, with the electronic processor, that the first upgrade priority score is greater than the second upgrade priority score, and in response to determining that the first upgrade priority score is greater than the second upgrade priority score, outputting, with the electronic processor, an upgrade priority notification configured to inform a user that the first video camera has a higher upgrade priority than the second video camera.

12. The method of claim 11, further comprising determining, with the electronic processor, that the first video camera and the second video camera are not configured to utilize video analytics to analyze video footage respectively captured by the first video camera and the second video camera.

13. The method of claim 11, wherein the higher upgrade priority of the first video camera indicates that replacing the first video camera with a third video camera configured to utilize video analytics to analyze video footage captured by the third video camera will result in more robust information about the security site than replacing the second video camera with the third video camera.

14. The method of claim 11, wherein the electronic processor is at least one of a group consisting of (i) located at a cloud-based electronic computing device remote from the security site, and (ii) located at a server located at the security site.

15. The method of claim 11, wherein the plurality of upgrade priority weighting factors includes at least one of a group consisting of a frequency at which objects are respectively detected within the first video footage and the second video footage, a distance from the respective video camera that captured the respective footage at which the objects are respectively detected within the first video footage and the second video footage, a respective quality level of the first video footage and the second video footage, a respective suitability level of the first video footage and the second video footage for object analysis, and a respective cost associated with upgrading the first video camera and the second video camera.

16. The method of claim 11, wherein determining that the first upgrade priority score is greater than the second upgrade priority score includes determining that the first upgrade priority score is greater than the second upgrade priority score in response to determining that an object included in the first video footage is also included in the second video footage at approximately the same time; and that the first video footage allows for more accurate object analysis of the object than the second video footage.

17. The method of claim 11, wherein each of the first upgrade priority score and the second upgrade priority score include a plurality of sub-scores, wherein each of the plurality of sub-scores indicate a respective priority of taking a different upgrade action with respect to the first video camera and the second video camera.

18. An electronic computing device comprising:

an electronic processor configured to store a list of a plurality of video cameras being considered for an upgrade, the plurality of video cameras installed at a security site and including a first video camera and a second video camera, receive first video footage captured by the first video camera and second video footage captured by the second video camera, analyze, using a video analytics engine, the first video footage and the second video footage to determine an adequacy of video coverage of each of the first video camera and the second video camera, wherein the adequacy of video coverage is determined based on (i) a frequency at which objects are respectively detected within the first video footage and the second video footage and (ii) a suitability level of a respective field of view of the first video camera and the second video camera for object analysis, determine that the frequency at which objects are detected within the first video footage is greater than or equal to the frequency at which objects are detected within the second video footage, determine that the suitability level of the field of view of the first video camera for object analysis is greater than the suitability level of the second video camera for object analysis, and in response to determining that (i) the frequency at which objects are detected within the first video footage is greater than or equal to the frequency at which objects are detected within the second video footage and (ii) that the suitability level of the field of view of the first video camera for object analysis is greater than the suitability level of the field of view of the second video camera for object analysis, determine that the first video camera has more adequate video coverage than the second video camera.

19. The electronic computing device of claim 18, wherein the electronic processor is configured to, in response to determining that the first video camera has more adequate video coverage than the second video camera, output an upgrade priority notification configured to inform a user that the first video camera has a higher upgrade priority than the second video camera, wherein the higher upgrade priority of the first video camera indicates that replacing the first video camera with a third video camera configured to utilize video analytics to analyze third video footage captured by the third video camera will result in more robust information about the security site than replacing the second video camera with the third video camera.

20. The electronic computing device of claim 18, wherein the electronic processor is configured to determine the suitability level of the respective field of view of the first video camera and the second video camera for object analysis based on (i) a distance from the respective video camera that captured the respective video footage at which the objects are detected within the respective footage and (ii) a viewing angle of the respective video camera with respect to the objects included in the respective video footage.

* * * * *